(12) United States Patent
Yasuda et al.

(10) Patent No.: US 8,167,138 B2
(45) Date of Patent: May 1, 2012

(54) DRY WASHING DEVICE

(75) Inventors: Issei Yasuda, Osaka (JP); Ko Fukuda, Hyogo (JP)

(73) Assignee: Panasonic Corporation, Osaka (JP)

( * ) Notice: Subject to any disclaimer, the term of this patent is extended or adjusted under 35 U.S.C. 154(b) by 764 days.

(21) Appl. No.: 11/813,537

(22) PCT Filed: Jan. 13, 2006

(86) PCT No.: PCT/JP2006/300783
§ 371 (c)(1),
(2), (4) Date: Jul. 9, 2007

(87) PCT Pub. No.: WO2006/075791
PCT Pub. Date: Jul. 20, 2006

(65) Prior Publication Data
US 2009/0188843 A1  Jul. 30, 2009

(30) Foreign Application Priority Data
Jan. 13, 2005 (JP) .................. 2005-005910

(51) Int. Cl.
*B04C 5/00* (2006.01)
(52) U.S. Cl. ........................ 209/715; 209/711
(58) Field of Classification Search ............ 209/711, 209/712, 715, 717, 721, 728, 729
See application file for complete search history.

(56) References Cited

U.S. PATENT DOCUMENTS

| 71,536 A | 11/1867 | Quick |
| 2,645,345 A | 7/1953 | Robert |
| 2,795,329 A | 6/1957 | Schaub |

FOREIGN PATENT DOCUMENTS

| CN | 2260668 Y | 8/1997 |
| DE | 3909721 A1 | 10/1990 |
| EP | 1156892 B1 | 11/2001 |
| GB | 715176 | 9/1954 |
| JP | 05007842 A | 1/1993 |
| JP | 11-28424 | 2/1999 |
| JP | 11-028424 A | 2/1999 |
| JP | 11-28424 A | 2/1999 |

(Continued)

OTHER PUBLICATIONS

International Search Report for PCT/JP2006/300783, dated May 2, 2006.

(Continued)

*Primary Examiner* — Joseph C Rodriguez
*Assistant Examiner* — Kalyanavenkateshware Kumar
(74) *Attorney, Agent, or Firm* — RatnerPrestia

(57) ABSTRACT

A dry cleaning apparatus separates heavy objects from mixture of the heavy objects and light objects having specific gravities smaller than those of the heavy objects. The dry cleaning apparatus includes a casing having a tubular shape having a center axis, an internal cylinder provided in the casing, a recovery section for recovering the heavy objects, a loading section for loading the mixture to above the internal cylinder, a flow inlet for introducing air to between the casing and the internal cylinder, and an outlet for discharging the light objects and air from between the casing and the internal cylinder. The casing has an inner surface extending substantially in parallel to a center axis. The internal cylinder has an upper surface having a center portion projecting upwardly, and has an outer surface having a portion which extends in parallel to the inner surface of the casing and which faces the inner surface of the casing. The recovery section is located under the internal cylinder.

18 Claims, 9 Drawing Sheets

FOREIGN PATENT DOCUMENTS

| | | |
|---|---|---|
| JP | 2001-187377 | 7/2001 |
| JP | 2001-187377 A | 7/2001 |
| JP | 2001-276743 | 10/2001 |
| JP | 2003515447 A | 5/2003 |
| JP | 2003-159567 | 6/2003 |
| JP | 2003-159567 A | 6/2003 |
| JP | 2005324170 A | 11/2005 |

OTHER PUBLICATIONS

Japanese Office Action for Application No. 2006-553035, Apr. 2, 2010, Panasonic Corporation.

Supplementary Partial Euripean Search Report for EP 06 70 0897, Mar. 25, 2011.

Japanese Application Serial No. 2010256666, Office Action mailed Nov. 16, 2011, 3 pgs.

Fig. 5

| | Distance 32C (mm) | Weight of Recovered Resin Pieces Classified by Diameter (g) | | | | | | | | | | | Average Diameter (mm) |
|---|---|---|---|---|---|---|---|---|---|---|---|---|---|
| | | <1.0 mm | 1.0 -2.0 | 2.0 -2.8 | 2.8 -4.0 | 4.0 -4.75 | 4.75 -5.6 | 5.6 -6.7 | 6.7 -8.0 | 8.0 -9.5 | 9.5 -11.2 | >11.2 mm | |
| Example 1 Sample 1 | 12 | 1 | 10 | 22 | 80 | 68 | 50 | 52 | 14 | 2 | 0 | 0 | 5 |
| Example 2 Sample 1 | 30 | 1 | 4 | 16 | 66 | 56 | 38 | 84 | 32 | 4 | 2 | 0 | 6 |
| Example 3 Sample 2 | 12 | 1 | 4 | 20 | 72 | 90 | 42 | 40 | 20 | 2 | 0 | 0 | 5 |
| Example 4 Sample 2 | 30 | 0 | 2 | 16 | 66 | 66 | 38 | 78 | 26 | 10 | 2 | 0 | 6 |

…

DRY WASHING DEVICE

This application is a U.S. National Phase Application of PCT International Application No. PCT/JP2006/300783.

TECHNICAL FIELD

The present invention relates to a dry cleaning apparatus used in a recycle system for reusing recovered objects, which is capable of selecting heavy objects (resin fragments) from a mixture of the heavy objects and light objects (dusts).

BACKGROUND OF THE INVENTION

In view of the increase of industrial waste, shortage of waste processing facilities, and environmental protection, the recycling and reusing of such wastes as resin fragments has been required in societies.

FIG. 10 is a schematic view of a conventional dry cleaning apparatus disclosed in Japanese Patent Laid-open Publication No. 2001-276743. Waste to be processed is a mixture of recovered objects to be reused (glass cullet) and adhesive objects (labels) having specific gravities smaller than those of the recovered objects. The conventional dry cleaning apparatus is a vertical air-blow type dry cleaning apparatus for separating the waste into recovered objects and adhesive objects with using a difference in the specific gravities and the difference in the resistance to air flow between the two objects.

A first funnel member 2 is provided at the upper part of a casing 1 having substantially a cylindrical shape. A second funnel member 3 is provided at the lower part of the casing 1. A chute 4 is provided between the funnel members 2 and 3. The chute 4 includes a center portion projecting upwardly and an outer edge located under the center portion. The chute 4 has a slant surface extending from the center portion to the outer edge.

The casing 1 has a flow inlet 5 provided at the lower thereof for introducing air under a joint between the second funnel member 3 and the casing 1 having the substantially cylindrical shape. A flow output 6 is provided under the joint between the first funnel member 2 and the casing 1 for discharging the light adhesive objects together with air.

A first gap 7 is provided between the casing 1 and the outer edge of the second funnel member 3. A second gap 8 is provided between the casing 1 and the outer edge of the chute 4. The first gap 7 is smaller than the second gap 8. The chute 4 is supported above the second funnel member 3 by support posts 3A.

The air introduced from the flow inlet 5 flows along the second funnel member 3 and passes upwardly through the first gap 7. The air rises and whirls along the first funnel member 2, and then, is discharged from the flow outlet 6.

An outlet opening 9 of the first funnel member 2 is located under the flow outlet 6. The heavy recovered objects cannot be raised by the flowing air, and accordingly, are hardly discharged from the flow outlet 6. On the other hand, the light adhesive objects are raised by the flowing air and discharged from the flow outlet 6.

The convention cleaning apparatus separates the waste (mixture) into the recovered objects and the adhesive objects with using the air introduced from the flow inlet. However, this apparatus does not remove the adhesive objects adhered to the recovered objects, for example, on the slant surface of the chute 4.

In the case that recovered objects passes through the first gap 7, this apparatus cannot recover the objects, thus allowing the objects to be accumulated on the bottom of the casing 1.

The second gap 8 is larger than the first gap 7. Consequently, if the light adhesive objects move along the slant surface of the chute 4 and move out of the air flowing from the flow inlet 5 to the flow outlet 6, the light members may be mixed with the recovered objects in the second funnel member 3 for recovering only the recovered objects. In order to solve this problem, the heights of the posts 3A supporting the chute 4 to control the air flowing from the first gap 7 to the second gap 8, requiring complicated design of the convention dry cleaning apparatus.

SUMMARY OF THE INVENTION

A dry cleaning apparatus separates heavy objects from mixture of the heavy objects and light objects having specific gravities smaller than those of the heavy objects. The dry cleaning apparatus includes a casing having a tubular shape having a center axis, an internal cylinder provided in the casing, a recovery section for recovering the heavy objects, a loading section for loading the mixture to above the internal cylinder, a flow inlet for introducing air to between the casing and the internal cylinder, and an outlet for discharging the light objects and air from between the casing and the internal cylinder. The casing has an inner surface extending substantially in parallel to a center axis. The internal cylinder has an upper surface having a center portion projecting upwardly, and has an outer surface having a portion which extends in parallel to the inner surface of the casing and which faces the inner surface of the casing. The recovery section is located under the internal cylinder.

The dry cleaning apparatus separates and recovers the heavy objects from the mixture of the heavy objects and the light objects without having these objects mixed.

BRIEF DESCRIPTION OF THE DRAWINGS

FIG. 5 illustrates the relationship between the average diameter of the recycling objects and the distance of a communication passage in the dry cleaning apparatus according to Embodiment 1.

DETAIL DESCRIPTION OF THE PREFERRED EMBODIMENTS (Exemplary Embodiment 1)

Figure 1:
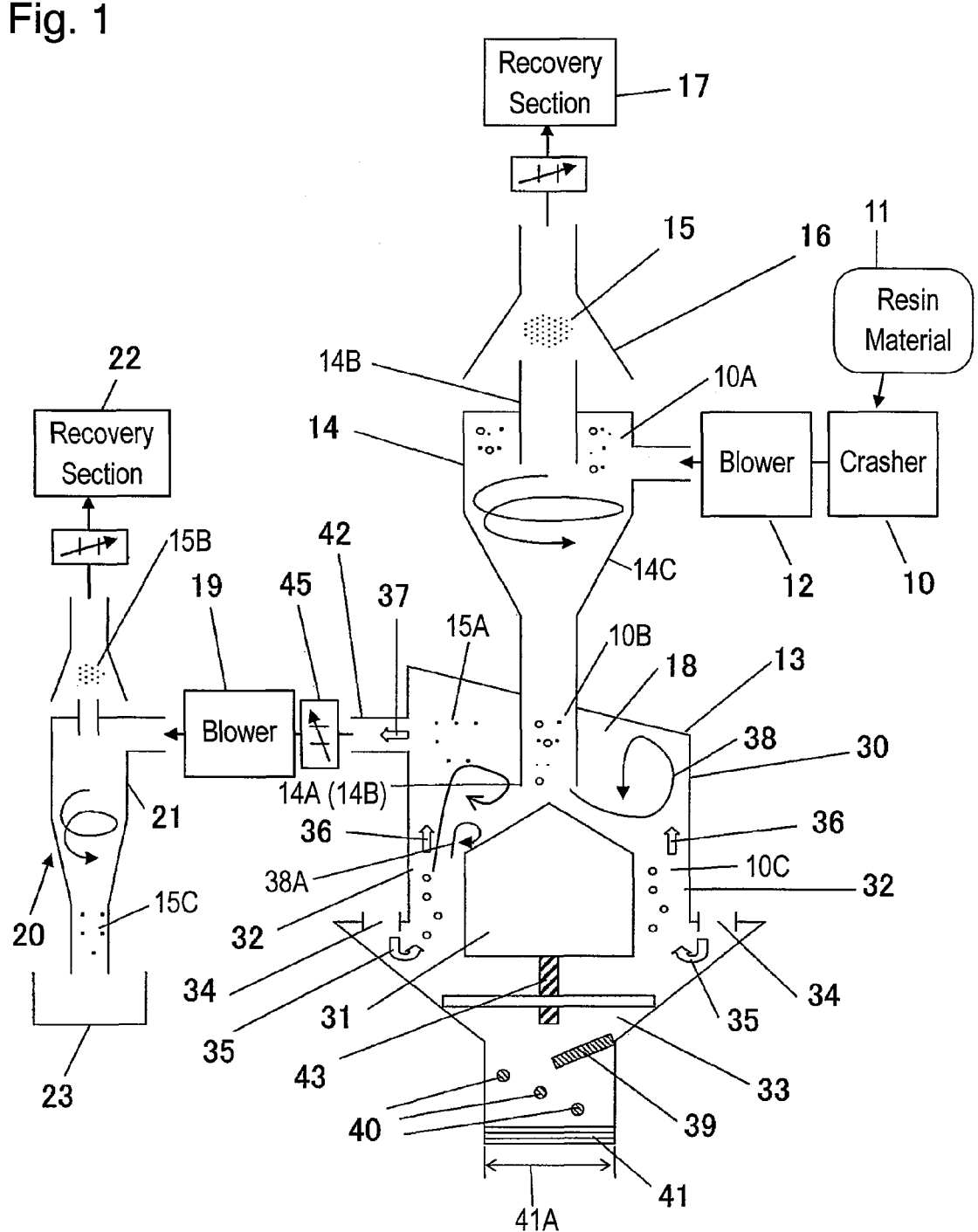
FIG. 1 is a schematic view of a sorter system according to Exemplary Embodiment 1 of the present invention.
Figure 2:
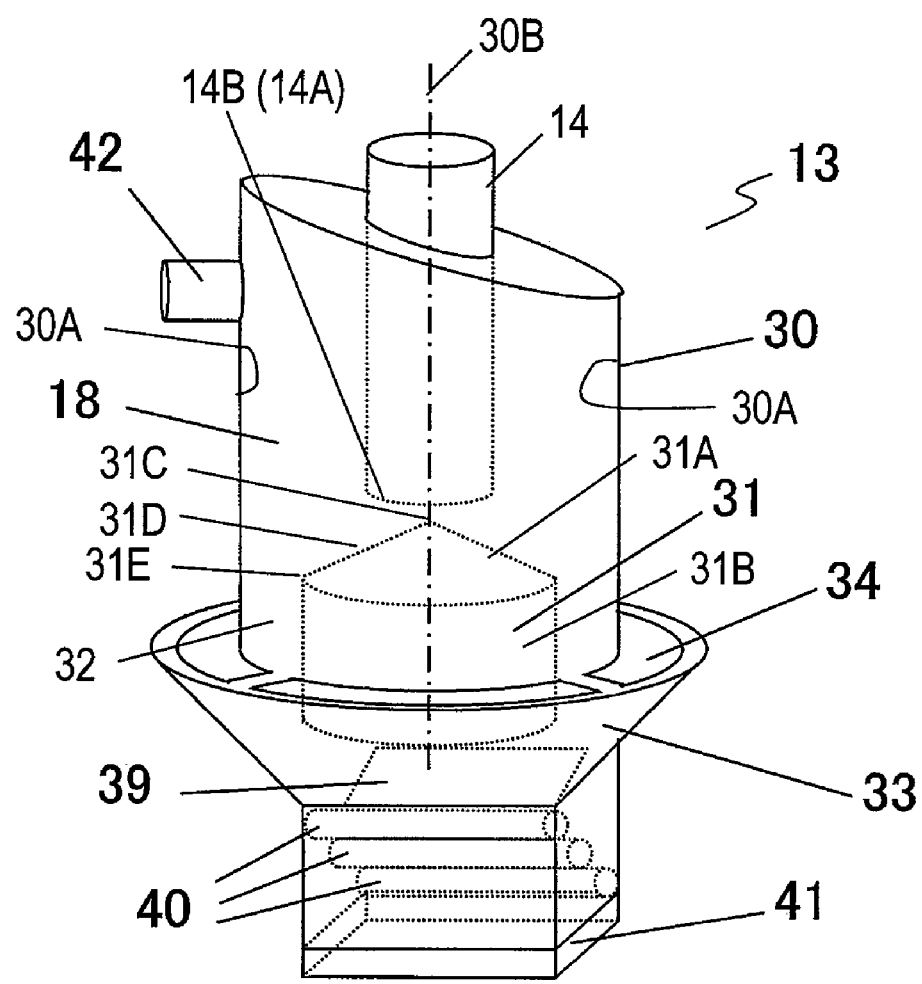
FIG. 2 is a perspective view of a dry cleaning apparatus according to Embodiment 1.

FIG. 1 is a schematic view of a sorter system including Embodiment 1 of the present invention. FIG. 2 is a perspective view of a dry cleaning apparatus 13 according to Exemplary Embodiment 1 of the present invention. The sorter system is used for recycling and reusing waste, particularly, resin objects assembled in electric appliances or automobiles as resources.

Resin objects 11, wastes used in an electric appliance or an automobile and recovered from local governments, electric appliance shops, or scrap facilities, often have adhesive objects (dusts) attached to the objects 11. The adhesive objects are lighter than the resin objects 11, i.e., have specific gravities smaller than those of the objects 11. The resin objects 11 are crushed into resin fragments 10A having predetermined sizes by a crasher 10 of cutting or rotary type.

The resin fragments 10A are sent to a loading section 14 of the dry cleaning apparatus 13 with a blower 12. The loading section 14 includes a cyclone hopper 14C having a funnel shape to absorb the speed of the resin fragments 10A forcibly sent with the blower 12. The resin fragments 10A accordingly drop freely and slowly to the dry cleaning apparatus 13.

The light, adhesive objects 15, such as dusts, adhered to the resin fragments 10A are blown up through a dust outlet 16 with a cyclone hopper 14C and received by a dust recovery section 17.

The resin fragments 10B received by the dry cleaning apparatus 13 are mixture of resin pieces 10C, heavy objects to be recovered, and adhesive pieces 15A, light pieces, such as dusts, adhered to the resin pieces 10C. The adhesive pieces 15A have specific gravities smaller than those of the resin pieces 10C. The resin fragments 10B are transferred to a cleaning section 18 for separating the resin fragment 10B into the resin pieces 10C and the adhesive pieces 15A. The adhesive pieces 15A are sent to a recovery section 21 of a dust sorter 20 by a blower 19.

The dust recovery section 21 has a funnel shape similar to that of the loading section 14. This shape produces a cyclone effect for separating the adhesive pieces 15A into small dusts 15C and fine dusts 15B smaller than the small dusts 15C. The dusts 15B and 15C are then received by dust recovery sections 22 and 23, respectively.

The dry cleaning apparatus 13 will be described in more detail below.

The dry cleaning apparatus 13 includes a casing 30 having substantially a cylindrical, tubular shape and an internal cylinder 31 installed in the casing 30, and includes the cleaning section 18, a communication passage 32, and a recovery section 33. An upper surface 31A of the internal cylinder 31 has a center portion 31C projecting upwardly, an outer edge 31E located under the center portion 31C, and a slant surface 31D extending from the center portion 31C to the outer edge 31E. The casing 30 having the substantially cylindrical shape has an inner surface 30A thereof which extends substantially in parallel to a center axis 30B and which faces the center axis 30B. The cleaning section 18 is implemented by a space surrounded by the inner surface 30A of the casing 30 and the upper surface 31A of the internal cylinder 31. The communication passage 32 is implemented by a space provided between the inner surface 30A of the casing 30 and the outer surface 31B of the internal cylinder 31. The inner surface 30A of the casing 30 is substantially in parallel to the outer surface 31B of the internal cylinder 31. The recovery section 33 is implemented by a space beneath the internal cylinder 31 and in the casing 30. The outer surface 31B of the internal cylinder 31 has a portion 31F thereof facing the inner surface 30A of the casing 30. The inner surface 31A of the casing 30 has a portion 30C thereof facing the portion 31F of the internal cylinder 31. End 14A of the loading section 14 has an opening 14B thereof located above the center portion 31C of the upper surface 31A of the internal cylinder 31. The mixture of the resin pieces is introduced from the opening 14B to above the upper surface 31A of the internal cylinder 31.

The casing 30 has a flow inlet 34 provided therein under the upper surface 31A of the internal cylinder 31 for introducing air. The air introduced from the flow inlet 34 flows between the inner surface 30A of the casing 30 and the outer surface 31A of the internal cylinder 31. A blower 19 produces air flows 35 to 37 from the air introduced from the flow inlet 34. The resin fragments 10B introduced from the loading section 14 move from the center portion 31C along the slant surface 31D to the outer edge 31E of the internal cylinder 31, i.e., to the communication passage 32.

The resin fragments 10B entering into the communication passage 32 are cleaned by the air flow 36. That is, the adhesive pieces 15A which are adhered weakly to the resin fragments 10B and mixed with the resin fragments are separated from the resin fragments 10B by the air flow 36, and are blown up in a direction 38 in the cleaning section 18. At this moment, the resin fragments 10B rub with each other and with the inner surface 30A of the casing 30 and the outer surface 31B of the internal cylinder 31, thereby removing the adhesive pieces 15A, such as dusts or paints, adhered to the resin fragments 10B. Thus, the resin fragments 10B, the mixture of the resin pieces 10C to be recovered for reuse and the adhesive pieces 10A can be cleaned and separated into the resin pieces 10C and the adhesive pieces 15A.

The adhesive pieces 15A and the resin pieces 10C have been separated from each other. The adhesive pieces 10A are separated from the resin pieces 10C and sent to the sorter 20 due to a balance between the force due to the dropping of the pieces 15A themselves and raising force produced by the air flow 36.

The resin pieces 10C rub with each other in the communication passage 32 and rub with the outer surface 31B of the internal cylinder 31 and the inner surface 30A of the casing 30, thereby being cleaned.

The cleaned resin pieces 10C have their metallic components thereof attracted and removed by magnets 39 and 40 provided in the recovery section 33. The resin pieces 10C having the metallic components removed are recovered in the recovery opening 41A of a recovery pot 41, thereby being reused as resources.

Air and light pieces can be discharged through an outlet 42 from between the inner surface 30A of the casing 30 and the outer surface 31B of the internal cylinder 31. The end 14A (opening 14B) of the loading section 14 is located under the outlet 42 provided at the cleaning section 18. This structure prevents the resin fragments 10B from entering to the outlet 42 before the resin fragments 10B are cleaned in the cleaning section 18.

Figure 3:
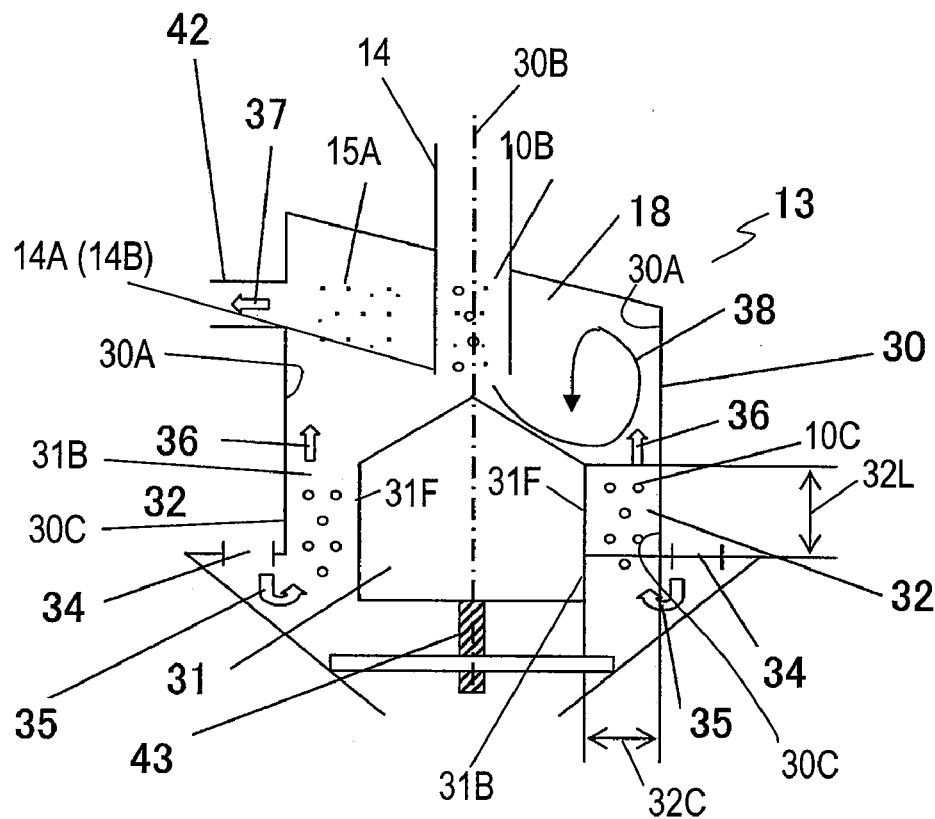
FIG. 3 is a cross sectional view of the dry cleaning apparatus according to Embodiment 1.

A method of controlling the resin pieces 10C to be recovered will be described below. FIG. 3 is a cross sectional view of the dry cleaning apparatus 13. The casing 30 having substantially the cylindrical shape has the center axis 30B extending substantially vertically. The communication passage 32 between the inner surface 30A of the casing 30 and the outer surface 31B of the internal cylinder 31 has a length 32L in a direction along the center axis 30B of the casing 30. The communication passage 32 has a width 32C in a direction substantially perpendicular to the center axis 30B of the casing 30. The width 32C is the minimum distance between the inner surface 30A of the casing 30 and the outer surface 31B of the internal cylinder 31. The minimum distance 32C may be determined appropriately, so that the speed of the air flow 36 can be maintained optimally for cleaning the resin pieces in the communication passage 32. The smaller the width 32C of the communication passage 32 is, the less the air flow 36 is introduced. The air flows 35 and 36 can be controlled by changing the length 32L of the communication passage 32. More specifically, the flow rate of the air flow 36 can be controlled by adjusting the length 32L and the width 32C of the communication passage 32, so that the flow rate can be determined optimally according to for the sizes of the resin pieces 10C to be recovered. Thus, the dry cleaning apparatus reduces the amount of the adhesive pieces 15A recovered together with the resin pieces 10C, thus having high effects for recovering of the resin pieces 10C.

Figure 4:
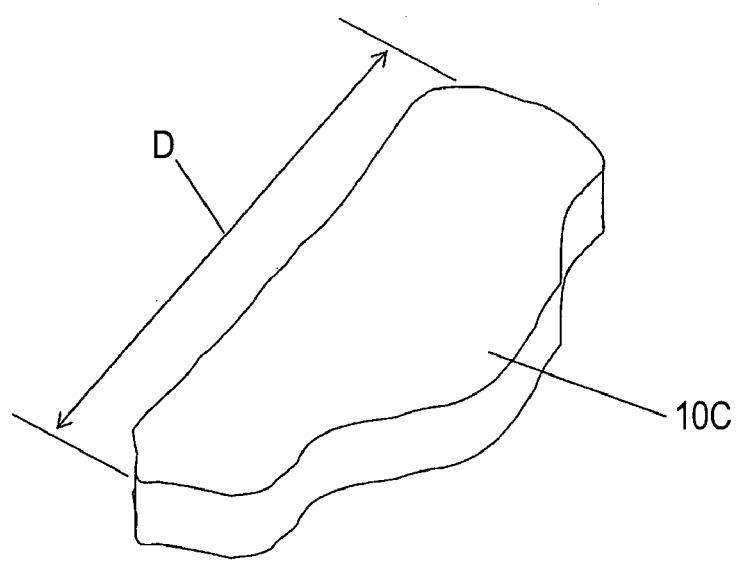
FIG. 4 is a perspective view of recycling objects to be recovered by the dry cleaning apparatus according to Embodiment 1.
Figure 6:
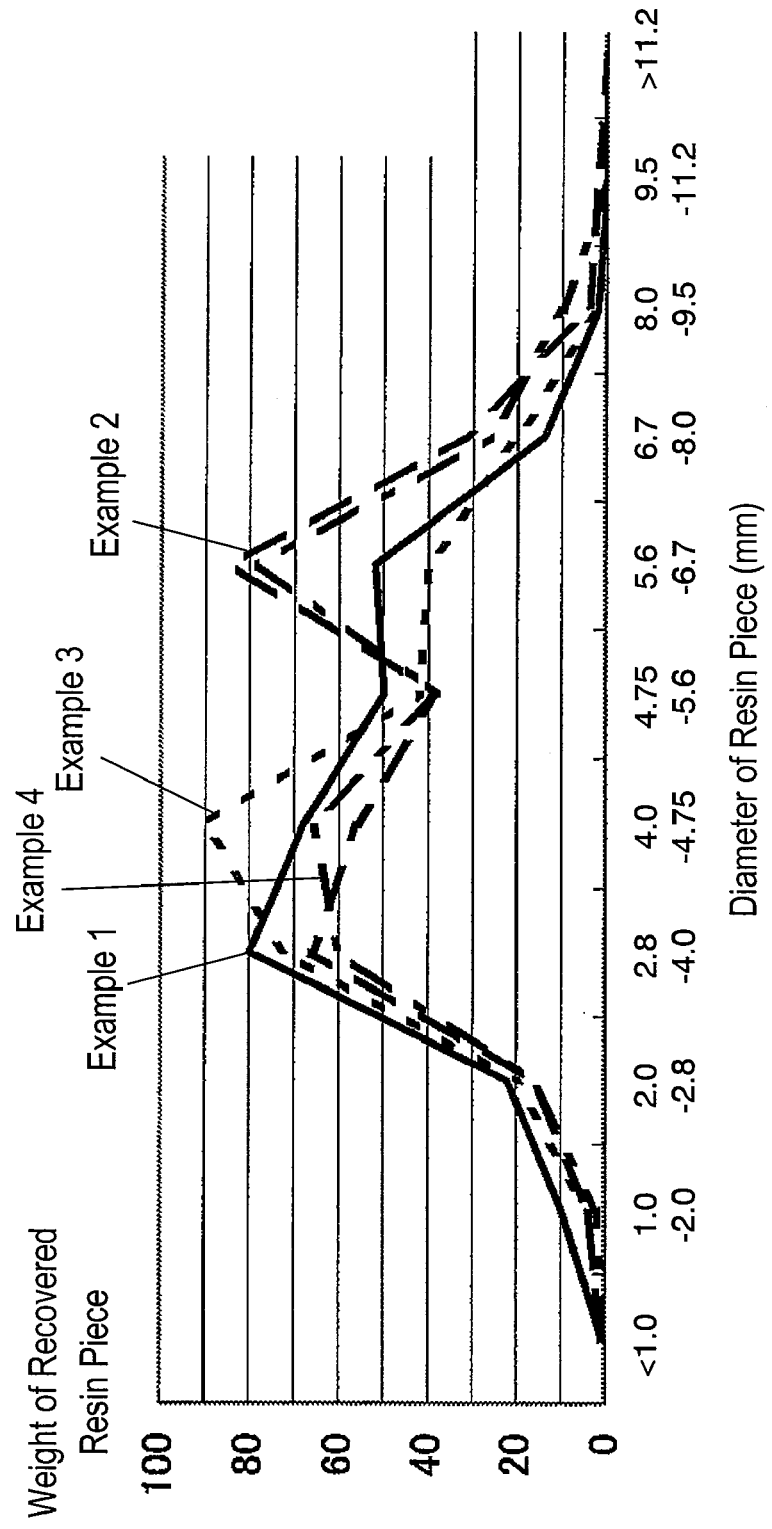
FIG. 6 illustrates the relationship between the average diameter of the recycling objects and the distance of a communication passage in the dry cleaning apparatus according to Embodiment 1.

FIG. 4 is a perspective view of the resin piece 10C to be recovered. The resin piece 10C has an average diameter D. According to an experiment, it was confirmed that the resin pieces 10C can be cleaned stably by determining the minimum distance 32C between the inner surface 30A of the casing 30 and the outer surface 31B of the internal cylinder 31 to be equal to or larger than twice the average diameter D and by determining the length 32L of the communication passage 32 to be equal to or larger than twice the average diameter D. Results of the experiment are shown in FIGS. 5 and 6. FIGS. 5 and 6 illustrate the distribution of the measurements of the diameter D of the resin pieces 10C having the weight of 300 g in total which were crashed by a crasher having screen diameters of 10 mm and 12 mm in the condition of two values of the minimum distance 32C between the inner surface 30A of the casing 30 and the outer surface 31B of the internal cylinder 31. The figures show the measurements of the weights of resin pieces 10C having various diameters D recovered from two samples 1 and 2 of the resin fragments 10B in the cleaning apparatus 13. The minimum distance 32C is determined to be 12 mm and 30 mm. The weights of the resin pieces 10C were measured with an electronic balance by every two grams. The weights of the resin pieces 10C less than two grams are shown as one gram in FIG. 5. In this experiment, the total 100 kg of resin objects were processed, and 300 g of the processed resin pieces were recovered. The recovered resin pieces were classified by their diameters with a sieve, and the weight of the classified resin pieces was measured with the electronic balance. In Example 1, the sample 1 (polystyrene) was crashed with a crasher having a screen diameter of 10 mm, and sent to the cleaning apparatus 13 having the minimum distance 32C of 12 mm. In Example 2, the sample 1 (polystyrene) was crashed with a crasher having a screen diameter of 12 mm, and sent to the cleaning apparatus 13 having the minimum distance 32C of 30 mm. In Example 3, the sample 2 (polypropylene) was crashed with the crasher having the screen diameter of 10 mm, and sent to the cleaning apparatus 13 having the minimum distance 32C of 12 mm. In Example 4, the sample 2 (polypropylene) was crashed with the crasher having the screen diameter of 12 mm, and sent to the cleaning apparatus 13 having the minimum distance 32C of 30 mm.

In Examples 1 and 3, the average diameter D of the recovered resin pieces 10C was 5 mm. In Examples 2 and 4, the average diameter D of the recovered resin pieces 10C was 6 mm. The rate of the weight of the recovered resin pieces 10C having diameters smaller than 1 mm was lower than 1 percent (not greater than 2 g per 300 g). Thus, it was confirmed that the light pieces (dusts) was effectively removed. As described above, the minimum distance 32C is determined to be equal to or larger than twice the average diameter D which is predetermined for reuse, thereby allowing the resin pieces 10C to be cleaned stably. According to the experiment, it was confirmed that the minimum distance 32C was preferably determined to be not greater than six times the average diameter D for cleaning effect. The minimum distance 32C exceeding six times the average diameter D reduces the cleaning effect produced by the rubbing with the surfaces 30A and 31B.

The cleaning apparatus 13 includes a position adjuster 43 for changing the position of the internal cylinder 31 as to optimize the length 32L of the communication passage 32. That is, the position adjuster 43 is adjusted according to the objects and sizes of the resin pieces 10C, thereby allowing the system to recover the resin pieces 10C as desired. The length 32L is determined to be equal to or larger than twice the desired average diameter D so that the resin pieces 10C can rub appropriately with the inner surface 30A of the casing 30 in the cleaning section 18. This arrangement allows the resin pieces 10C to be cleaned stably. In Examples 1 to 4, the length 32L was 65 mm. According to the experiment, it was confirmed that the length 32L was not larger than twenty times the average diameter D for optimizing the flow of air from the blower 19 as well as the easiness of installation and the operability of the dry cleaning apparatus 13. The length 32L exceeding twenty times the average diameter D reduces the speed of the resin pieces 10C in a horizontal direction, i.e., a direction perpendicular to the center axis 30B due to a floating force (resistive force). Accordingly, the resin pieces 10C rub less with the inner surface 30A of the casing 30 and the outer surface 31B of the internal cylinder 31, accordingly reducing the cleaning effect produced by the rubbing with the surfaces 30A and 31B.

The minimum distance 32C between the casing 30 and the internal cylinder 31 is first determined practically. Then, the length 32L of the communication passage 32, the flow fate of air from the blower 19, and the opening of a damper 45 provided in front of the blower 19 are adjusted while the cleaning effect for the resin pieces 10C is monitored as to control the speed of the air flow 36 flowing through the communication passage 32 The casing 30 has the cylindrical shape. This shape allows the resin pieces 10C to be recovered evenly in the recovery section 33, accordingly allowing the recovery section 33 to have a small size. The dry cleaning apparatus 13 has a small size accordingly.

The cleaning apparatus 13 according to Embodiment 1 can clean the resin pieces 10C, objects to be recovered, in the cleaning section 18 and the communication passage 32, thus removing the adhesive pieces 15A, such as dusts, efficiently.

(Exemplary Embodiment 2)

Figure 7:
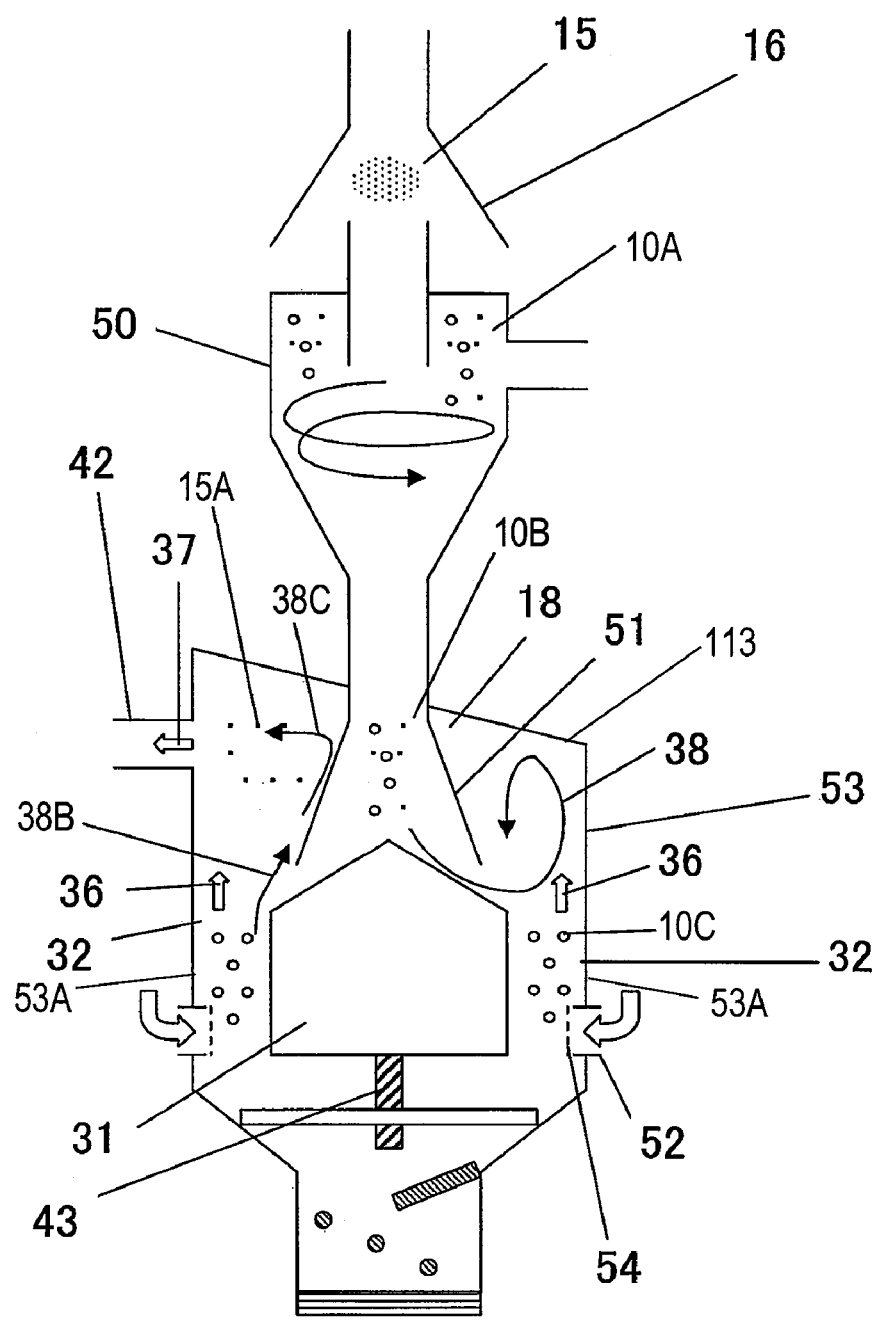
FIG. 7 is a cross sectional view of a dry cleaning apparatus according to Exemplary Embodiment 2 of the invention.

FIG. 7 is a cross sectional view of a dry cleaning apparatus 113 according to Exemplary Embodiment 2 of the present invention. The same components as those of the cleaning apparatus 13 of Embodiment 1 shown in FIG. 1 will be denoted by the same reference numerals, and their description will be omitted.

The cleaning apparatus 113 according to Embodiment 2, differently from the cleaning apparatus 13 according to Embodiment 1, includes a taper portion provided at the end of the loading section 50 facing the internal cylinder 31. The taper portion 51 flares towards the internal cylinder 31. The taper portion 51 prevents turbulence air flow 38A generated in the cleaning apparatus 13 shown in FIG. 1. The upward air flow 36 from the communication passage 32 provides smooth air flow 38B flowing from an upper end of the internal cylinder 31 to the taper portion 51.

The turbulence air flow 38A shown in FIG. 1 may cause the adhesive pieces 15A to stagnate above the upper surface 31A of the internal cylinder 31. The air flow 38B shown in FIG. 7 prevents the adhesive pieces 15A from stagnating, thereby discharging the adhesive pieces 15A smoothly from the outlet 42 along the air flows 36, 38B, 38C, and 37. Thus, the adhesive pieces 15A staying in the cleaning section 18 are reduced, and the resin pieces 10C can be separated from the adhesive pieces 15A accurately.

The flow inlet 52 may be provided in a wall 53A of a casing 53, as shown in FIG. 7. In this case, the flow inlet 52 may be preferably covered with mesh cover 54 in order to prevent the resin pieces 10C from running from the flow inlet 52 to the outside of the casing 53. The width 32C and the length 32L of the communication passage 32 are necessarily provided in a region above the flow inlet 52 provided in the wall 53A of the casing 53. This arrangement allows the cleaning apparatus 113 to be installed at an area smaller than an installation area of the cleaning apparatus 13 according to Embodiment 1 while providing the apparatus 113 with a longer vertical size.

(Exemplary Embodiment 3)

Figure 8A:
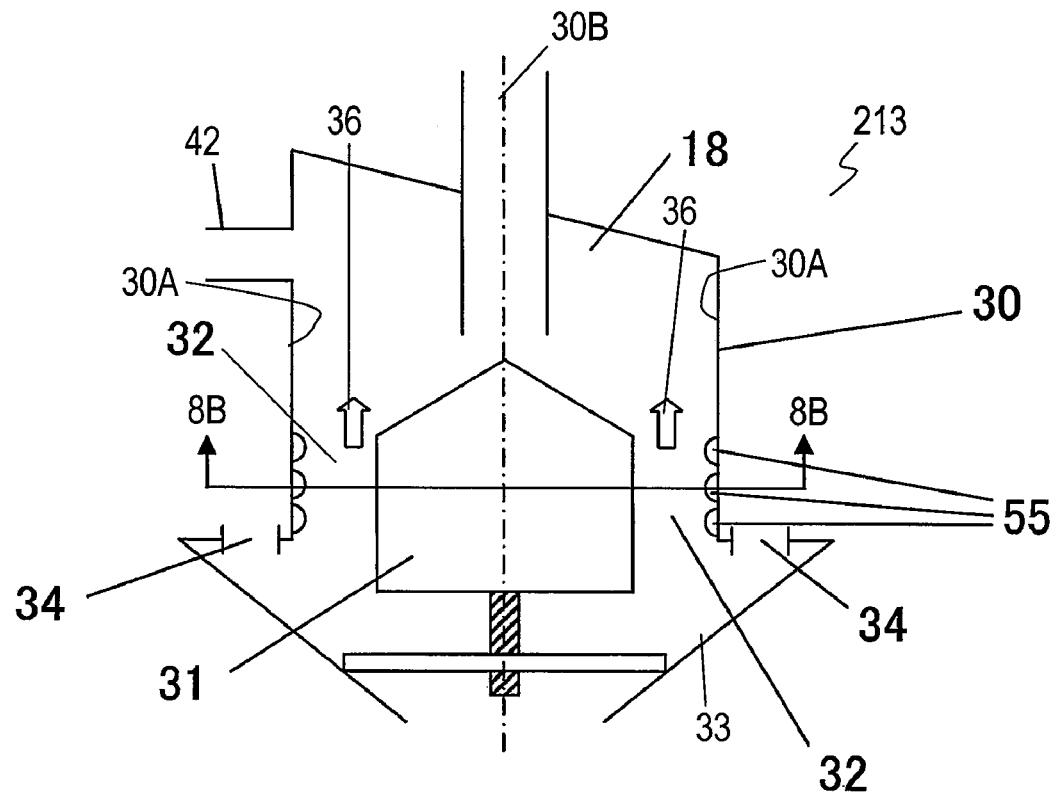
FIG. 8A is a vertical cross sectional view of a dry cleaning apparatus according to Exemplary Embodiment 3 of the invention.
Figure 8B:
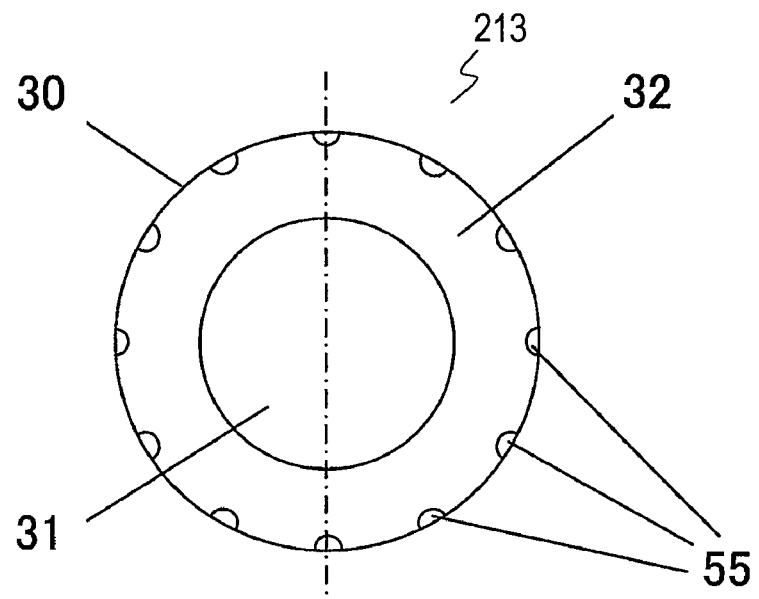
FIG. 8B is a horizontal cross sectional view of the dry cleaning apparatus at line 8B-8B shown in FIG. 8A.

FIG. 8A is a vertical cross sectional view of a dry cleaning apparatus 213 according to Exemplary Embodiment 3 of the present invention. FIG. 8B is a horizontal cross sectional view of the dry cleaning apparatus 213 at line 8B-8B shown in FIG. 8A. The same components as those of the cleaning apparatus 13 according to Embodiment 1 are denoted by the same reference numerals, and their description will be omitted. The cleaning apparatus 213 includes plural projections 55 provided on the inner surface 30A of the casing 30 at the communication passage 32.

In the cleaning apparatus 13 according to Embodiment 1, if the length 32L or the width 32C of the communication passage 32 is increased, the cleaning effect produced by the rubbing of the resin pieces 10C with the surfaces 30A and 31B is reduced.

The projections 55 on the inner surface 30A at the communication passage 32 of the casing 30 causes the resin pieces 10C to collide and rub with the projection 55, as shown in FIG. 8A, while the resin pieces 10C pass through the communication passage 32. This facilitates separating the adhesive pieces 15A from the resin pieces 10C. In addition, the separated adhesive pieces 15A are raised in a direction opposite to a direction directing towards the recovery section 33 by the air flow 36 flowing from the flow inlet 34 along the communication passage 32 to the cleaning section 18. Thus, the amount of the adhesive pieces 15A, unnecessary objects mixed with the resin pieces 10C recovered in the recovery pot 41, can be reduced.

Figure 9A:
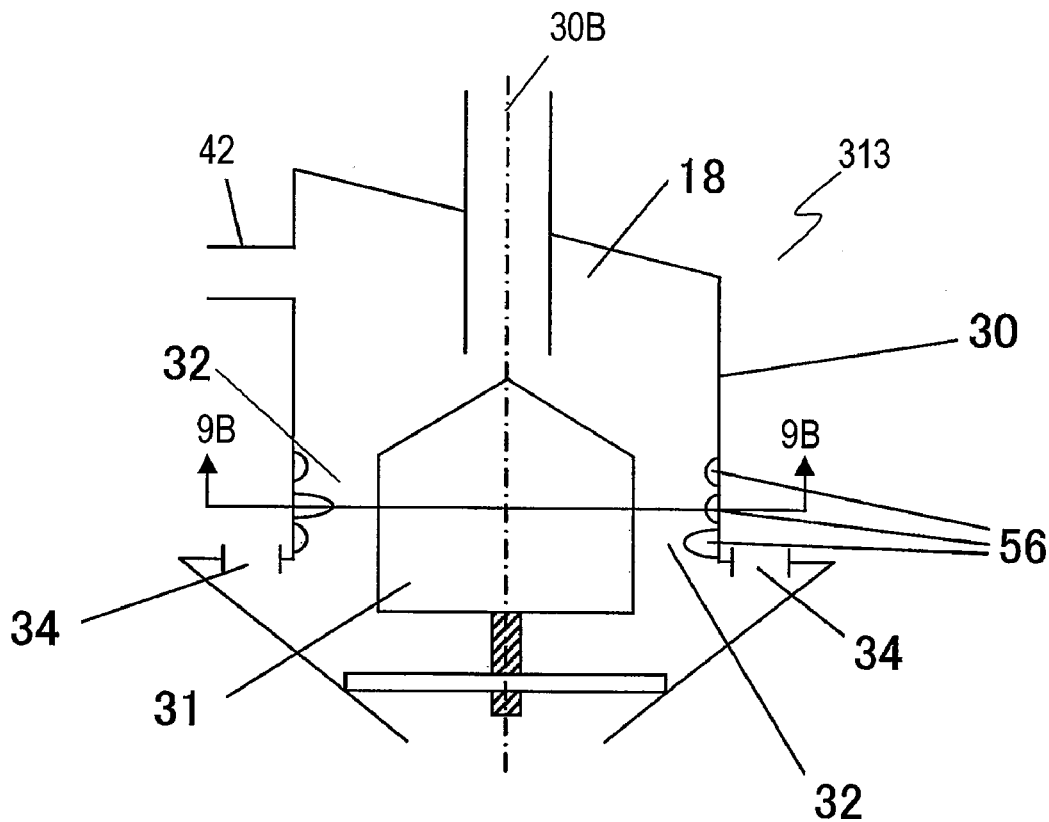
FIG. 9A is a vertical cross sectional view of another dry cleaning apparatus according to Embodiment 3.
Figure 9B:
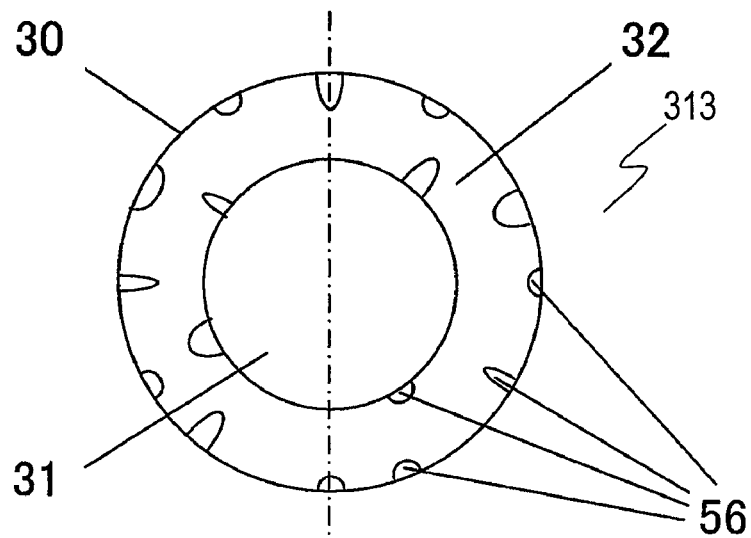
FIG. 9B is a horizontal cross sectional view of the dry cleaning apparatus at line 9B-9B shown in FIG. 9A.
Figure 10:
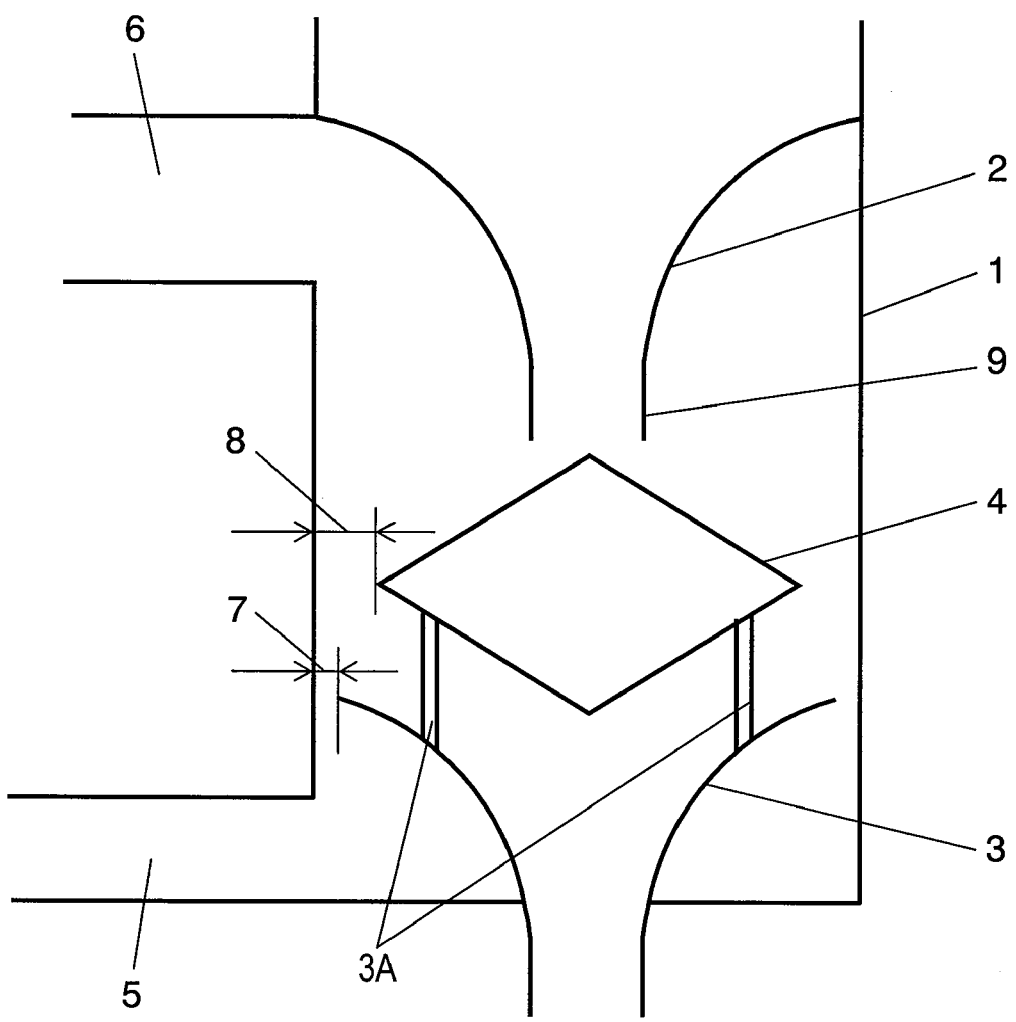
FIG. 10 is a schematic view of a conventional dry cleaning apparatus.

FIG. 9A is a vertical cross sectional view of another dry cleaning apparatus 313 according to Embodiment 3. FIG. 9B is a horizontal cross sectional view of the dry cleaning apparatus 313 at line 9B-9B shown in FIG. 9A. The same components as those of the cleaning apparatus 13 according to Embodiment 1 are denoted by the same reference numerals, and their description will be omitted. The cleaning apparatus 313 includes plural turbulence projections 56 provided at the communication passage 32 on the inner surface 30A of the casing 30 and the outer surface 31A of the internal cylinder 31. The turbulence projections 56 have heights different from each other.

The turbulence projections 56 produces turbulence air flows in the communication passage 32. This operation allows the resin pieces 10A to collide and rub not only with the projections 56 but also with the inner surface 30A at the communication passage 32 of the casing 30, and allows the resin pieces to collide and rub with one another to promote the abrasive action. Thus, the amount of the adhesive pieces 15A, unnecessary objects mixed with the resin pieces 10C recovered in the recovery pot 41, can be reduced.

While the cleaning apparatus 213 shown in FIG. 8B includes the projections 55 provided only on the inner surface 30A at the communication passage 32 of the casing 30, the cleaning apparatus 313 shown in FIG. 9B includes the turbulence projections 56 provided at the communication passage 32 on the inner surface 30A of the casing 30 and the outer surface 31B of the internal cylinder 31. The positions of projections 55 and 56 may be determined arbitrarily according to the width 32C of the communication passage 32 and the properties of the resin pieces 10C to be recovered.

The dry cleaning apparatuses 13, 113, 213, and 313 according to Embodiments 1 to 3 recover the resin pieces 10C, objects to be recovered, from the resin objects, wastes. The dry cleaning apparatus according to the embodiments, however, may be recover objects to be recovered from other wastes, such as plastic films and paper sheets, which can be recovered with a sorter system using wind power, providing the same effects.

INDUSTRIAL APPLICABILITY

A dry cleaning apparatus according to the invention separates and recovers heavy objects from mixture of the heavy objects and light objects without having these objects mixed. This apparatus is useful for recycling systems for reuse of the recovered objects.

REFERENCE NUMERALS

14 Loading Section
18 Cleaning Section
30 Casing
31 Inner Cylinder
32 Communication Passage
33 Recovering Section
34 Flow Inlet
42 Outlet
43 Position Adjuster
55 Projection
56 Turbulence Projection

The invention claimed is:

1. A dry cleaning apparatus for separating heavy objects from mixture of the heavy objects and light objects having specific gravities smaller than specific gravities of the heavy objects, the dry cleaning apparatus comprising:
   a casing having a tubular shape having a center axis extending substantially in a vertical direction, the casing having an inner surface thereof extending substantially in parallel to the center axis;
   an internal cylinder provided in the casing, the internal cylinder having an upper surface and an outer surface thereof, the upper surface of the internal cylinder having a center portion projecting upwardly, the outer surface of the internal cylinder having a portion extending in parallel to the inner surface of the casing, the portion of the outer surface of the internal cylinder facing the inner surface of the casing;
   a recovery section provided under the internal cylinder for recovering the heavy objects;
   a loading section for loading the mixture to above the upper surface of the internal cylinder comprising a walled passage way with an inlet end and an outlet end, wherein the outlet end comprises an opening which is located above the center portion of the internal cylinder;

a flow inlet provided in the casing in a bottom portion of a space between the inner surface of the casing and the outer surface of the internal cylinder and under the upper surface of the internal cylinder, for introducing air to between the inner surface of the casing and the outer surface of the internal cylinder, the flow inlet surrounding a bottom edge of the casing; and an outlet provided in the casing, the outlet being located above the upper surface of the internal cylinder and above the outlet end of the loading section in the casing, the outlet being capable of discharging the light objects and air from between the inner surface of the casing and the outer surface of the internal cylinder, wherein the inner surface of the casing has a portion facing the portion of the outer surface of the internal cylinder, the dry cleaning apparatus further comprising a projection provided on at least one of the portion of the inner surface of the casing and the portion of the outer surface of the internal cylinder.

2. The dry cleaning apparatus according to claim 1, wherein the projection produces turbulence flow of air between the inner surface of the casing and the outer surface of the internal cylinder.

3. The dry cleaning apparatus according to claim 1,
wherein the inner surface of the casing has a portion facing a portion of the outer surface of the internal cylinder, and
wherein the portion of the inner surface of the casing and the portion of the outer surface of the internal cylinder provides a communication passage, the dry cleaning apparatus further comprising
a position adjuster for changing a position of the internal cylinder to determine a length of the communication passage in a direction along the center axis.

4. The dry cleaning apparatus according to claim 1, wherein a minimum distance between the portion of the outer surface of the internal cylinder and the portion of the inner surface of the casing is equal to or larger than twice an average diameter of the heavy objects.

5. The dry cleaning apparatus according to claim 1, wherein a length of the portion of the outer surface of the internal cylinder in a direction along the center axis is equal to or larger than twice an average diameter of the heavy objects.

6. The dry cleaning apparatus according to claim 1, further comprising a magnet provided in the recovery section.

7. The dry cleaning apparatus according to claim 1, further comprising a taper section at the end of the loading section facing the internal cylinder.

8. The dry cleaning apparatus according to claim 7, wherein the taper section flares towards the internal cylinder.

9. A dry cleaning apparatus for separating heavy objects from mixture of the heavy objects and light objects having specific gravities smaller than specific gravities of the heavy objects, the dry cleaning apparatus comprising:

a casing having a tubular shape having a center axis extending substantially in a vertical direction, the casing having an inner surface thereof extending substantially in parallel to the center axis;

an internal cylinder provided in the casing, the internal cylinder having an upper surface and an outer surface thereof, the upper surface of the internal cylinder having a center portion projecting upwardly, the outer surface of the internal cylinder having a portion extending in parallel to the inner surface of the casing, the portion of the outer surface of the internal cylinder facing the inner surface of the casing;

a recovery section provided under the internal cylinder for recovering the heavy objects;

a loading section for loading the mixture to above the upper surface of the internal cylinder comprising a walled passage way with an inlet end and an outlet end wherein the outlet end comprises an opening which is located above the center portion of the internal cylinder;

a flow inlet provided in the casing in a bottom portion of a space between the inner surface of the casing and the outer surface of the internal cylinder and under the upper surface of the internal cylinder, for introducing air to between the inner surface of the casing and the outer surface of the internal cylinder, the flow inlet surrounding a bottom edge of the casing; and an outlet provided in the casing, the outlet being located above the upper surface of the internal cylinder and above the outlet of the loading section in the casing, the outlet being capable of discharging the light objects and air from between the inner surface of the casing and the outer surface of the internal cylinder, wherein the inner surface of the casing has a portion facing the portion of the outer surface of the internal cylinder, the dry cleaning apparatus further comprising a plurality of projections provided on at least one of the portion of the inner surface of the casing and the portion of the outer surface of the internal cylinder.

10. The dry cleaning apparatus according to claim 9, wherein the projections have heights different from each other.

11. The dry cleaning apparatus according to claim 9, wherein a minimum distance between the portion of the outer surface of the internal cylinder and the portion of the inner surface of the casing is equal to or larger than twice an average diameter of the heavy objects.

12. The dry cleaning apparatus according to claim 9, wherein a length of the portion of the outer surface of the internal cylinder in a direction along the center axis is equal to or larger than twice an average diameter of the heavy objects.

13. The dry cleaning apparatus according to claim 9, further comprising a magnet provided in the recovery section.

14. The dry cleaning apparatus according to claim 9, further comprising a taper section at the end of the loading section facing the internal cylinder.

15. The dry cleaning apparatus according to claim 14, wherein the taper section flares towards the internal cylinder.

16. A dry cleaning apparatus for separating heavy objects from mixture of the heavy objects and light objects having specific gravities smaller than specific gravities of the heavy objects, the dry cleaning apparatus comprising:

a casing having a tubular shape having a center axis extending substantially in a vertical direction, the casing having an inner surface thereof extending substantially in parallel to the center axis;

an internal cylinder provided in the casing, the internal cylinder having an upper surface and an outer surface thereof, the upper surface of the internal cylinder having a center portion projecting upwardly, the outer surface of the internal cylinder having a portion extending in parallel to the inner surface of the casing, the portion of the outer surface of the internal cylinder facing the inner surface of the casing;

a recovery section provided under the internal cylinder for recovering the heavy objects;

a loading section for loading the mixture to above the upper surface of the internal cylinder comprising a walled passage way with an inlet end and an outlet end wherein the outlet end comprises an opening which is located above the center portion of the internal cylinder;

a flow inlet provided in the casing in a bottom portion of a space between the inner surface of the casing and the outer surface of the internal cylinder and under the upper surface of the internal cylinder, for introducing air to between the inner surface of the casing and the outer surface of the internal cylinder, the flow inlet surrounding a bottom edge of the casing; and an outlet provided in the casing, the outlet being located above the upper surface of the internal cylinder and above the outlet of the loading section in the casing, the outlet being capable of discharging the light objects and air from between the inner surface of the casing and the outer surface of the internal cylinder.

17. The dry cleaning apparatus according to claim 16, further comprising a taper section at the end of the loading section facing the internal cylinder.

18. The dry cleaning apparatus according to claim 17, wherein the taper section flares towards the internal cylinder.

* * * * *

UNITED STATES PATENT AND TRADEMARK OFFICE
CERTIFICATE OF CORRECTION

| | | |
|---|---|---|
| PATENT NO. | : 8,167,138 B2 | Page 1 of 1 |
| APPLICATION NO. | : 11/813537 | |
| DATED | : May 1, 2012 | |
| INVENTOR(S) | : Issei Yasuda et al. | |

It is certified that error appears in the above-identified patent and that said Letters Patent is hereby corrected as shown below:

Title Page 2

At FIELD [56], References Cited, OTHER PUBLICATIONS:
"Supplementary Partial Euripean Search Report" should read -- Supplementary Partial European Search Report --

Signed and Sealed this
Seventeenth Day of July, 2012

David J. Kappos
*Director of the United States Patent and Trademark Office*